United States Patent [19]

Kreitenberg

[11] 4,168,621
[45] Sep. 25, 1979

[54] PLUMBING TEST GAUGE

[76] Inventor: Harvey Kreitenberg, 607 N. Alta Dr., Beverly Hills, Calif. 90210

[21] Appl. No.: 835,729

[22] Filed: Sep. 22, 1977

[51] Int. Cl.² .......................................... G01M 3/28
[52] U.S. Cl. ................... 73/40.5 R; 73/49.8; 138/90
[58] Field of Search .............. 73/40.5 R, 40, 49.6, 73/49.8, 146.8; 116/34 R; 138/90

[56] References Cited

U.S. PATENT DOCUMENTS

| 1,152,276 | 8/1915 | Bowden | 73/146.8 X |
|---|---|---|---|
| 1,213,958 | 1/1917 | Schweinert et al. | 73/146.8 X |
| 1,328,572 | 1/1920 | Lees | 73/146.8 |
| 1,374,578 | 4/1921 | Kraft | 73/146.8 X |
| 1,473,171 | 11/1923 | Bowden | 73/146.8 |
| 2,507,124 | 5/1950 | Stillinger | 73/49.6 |
| 2,569,120 | 9/1951 | Van Heuvel et al. | 73/146.8 X |
| 3,380,427 | 4/1968 | Rubin | 73/146.8 X |
| 3,859,849 | 1/1975 | Novak | 73/146.8 |

*Primary Examiner*—Richard C. Queisser
*Assistant Examiner*—Joseph W. Roskos
*Attorney, Agent, or Firm*—Flam & Flam

[57] ABSTRACT

A pressure indicator rod is attached to a spring pressed piston mounted upon a cap for a plumbing line. The rod is entirely retracted in the absence of pressure to be protected from impact and to be shielded from vandals. The indicator rod is visible from any angle for ease of reading.

6 Claims, 3 Drawing Figures

PLUMBING TEST GAUGE

FIELD OF INVENTION

This invention relates to gauges for inspection of plumbing lines preparatory to utility hookup.

BACKGROUND OF THE INVENTION

In order to determine that a plumbing system is free of leaks, it is common to attach a test instrument to a nipple later to be connected to the gas or water meter. The instrument includes a cap for mounting on the nipple, a one way valve, such as a conventional tire valve, for admission of fluid under pressure into the line and a pressure gauge for detecting any drop in pressure. The system is charged with compressed air to a certain noted pressure and permitted to stand for a relatively long period of time during which time the gauge is unattended and exposed to usual hazards of a construction job. It has been common to use a Bourdon type gauge, complete with glass face plate. Such gauges tend to collect wet plaster and other debris. Often the gauge faces in the wrong direction. Reading the gauge is often cumbersome. Furthermore, it is not uncommon for such gauges to be broken deliberately or by accident.

The primary object of the present invention is to provide an improved test instrument for plumbing lines.

SUMMARY OF INVENTION

In order to accomplish the foregoing object, I provide a test instrument in which the gauge comprises an indicator rod attached to a pressure sensing piston that acts against a spring. The rod is entirely retracted into the gauge case when the pressure is zero whereby it is concealed from vandals and accident. Whatever the installation, the rod is readable from any angle. The danger of the gauge becoming obscured is significantly reduced not only by virtue of the retractable rod, but also because the case is made of non-stick plastic.

BRIEF DESCRIPTION OF THE DRAWINGS

A detailed description of the invention will be made with reference to the accompanying drawings wherein like numerals designate corresponding parts in the several figures. These drawings, unless described as diagrammatic or unless otherwise indicated, are to scale.

DETAILED DESCRIPTION OF PREFERRED EMBODIMENT

Figure 1:
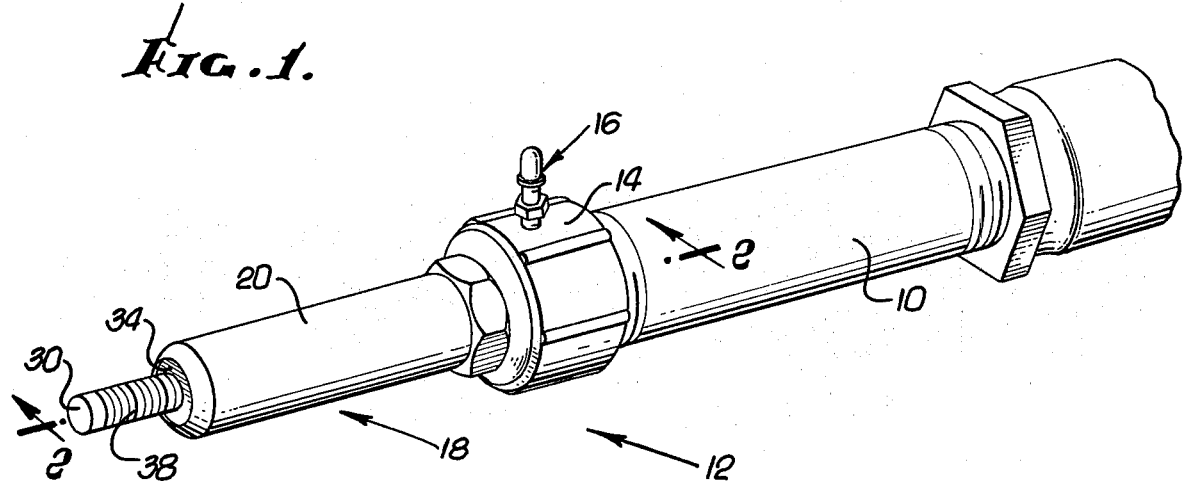
FIG. 1 is a pictorial view of a test instrument incorporating the present invention, and shown in place upon a nipple of a plumbing.

Shown in FIG. 1 is a nipple 10 intended later to be connected to the gas or water meter. The test instrument 12 includes a cap 14 threadedly attached to the end of the nipple 10, a one way valve 16, for admission of fluid under pressure into the system and a gauge 18. The valve 16 is a conventional tire valve.

Figure 2:
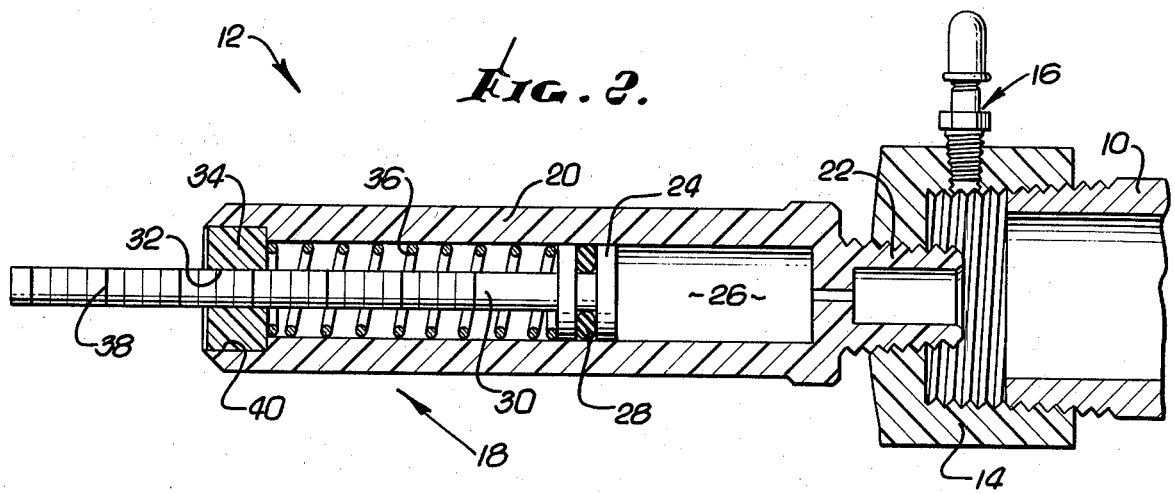
FIG. 2 is an enlarged longitudinal sectional view of the test instrument, and taken along a plane corresponding to line 2—2 of FIG. 1.

The gauge 18 includes an elongated casing 20 having a reduced nipple 22 at one end for attachment to, and connection with, the center of the cap 14. As shown in FIG. 2, a pressure sensing piston 24 divides the interior cylindrical chamber of the casing 20 into a space 26 in fluid communication, via nipple 22, with the nipple 10 and the entire system. An O-ring 28 seals the space 26. An indicator 30 is attached at one end to the piston 24 and projects through a guide aperture 32 in a guide plug 34. A coiled retraction spring 36 surrounds the indicator rod to counterbalance the pressure acting on the inside of the piston 24. The rod carries scale markings 38 that read directly in pounds per square inch or the like.

Figure 3:
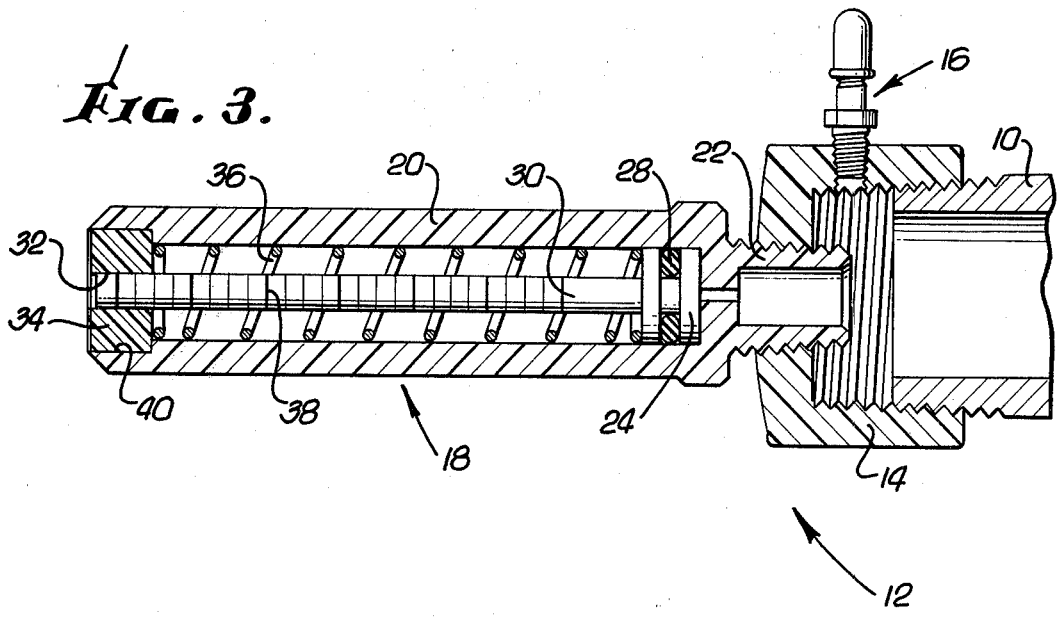
FIG. 3 is a sectional view similar to FIG. 2, but illustrating the indicator rod in its retracted position.

The system is charged by admitting air under pressure through the valve 16. This may be done, for example, by a building or plumbing inspector who returns some time later to determine if any slow leaks are present. Before the system is charged, the rod 30 is fully retracted into the guide aperture 32 as shown in FIG. 3. The rod 30 is therefore shielded to minimize accident and to thwart vandalism.

The plug 34 itself is recessed into a counterbore 48 at the end of the casing 20 further to protect the instrument from accidental or intentional damage or disengagement. For this purpose, the plug is made of plastic that is welded, as by heat or solvent, to the end of the casing.

The rod 30 is conveniently readable from any angle. Since it is coaxially aligned with the cap 14 and the nipple 10, its readability is ensured however many turns it may take to tighten the cap 14 on the nipple 10. The casing 20 and the plug 34 are made of non-stick plastic, such as Teflon, thus to minimize the chance of any plaster or other debris adhering to the casing or plug that might block the path of movement of the rod 30 or obscure a reading thereof.

Intending to claim all novel, useful and unobvious features shown or described, I make the following claims:

1. In a plumbing distribution system for a building, said system including a nipple forming a temporary pipe line terminus, the combination therewith of a test instrument for determining the integrity of the system which comprises:
    (a) a cap having provisions for threaded attachment to said nipple;
    (b) a one way valve supported on said cap and communicating with the interior thereof for charging said system;
    (c) a pressure gauge including an elongated substantially tubular casing having one end attached to said cap to communicate with the interior cap thereof;
    (d) said casing having an internal cylindrical chamber;
    (e) a pressure sensing piston slidable in the chamber and dividing said chamber into an outer space and an inner sealed space exposed to the interior of said cap and to said pipe line;
    (f) an indicator rod attached to said piston and guided for projecting through the distal end of said casing in accordance with the position of said piston; and
    (g) a coiled retraction spring in said outer space counterbalancing fluid pressure applied to said piston.

2. The system as set forth in claim 1 in which a plug recessed into the distal end of said casing provides the guide aperture for said indicator rod, said rod being entirely recessed within said guide aperture when said pressure sensing piston moves to its retracted position whereby said indicator rod and said plug are protected against accident and from vandalism.

3. The system as set forth in claim 2 in which said casing is made of non-stick plastic to avoid adherence of foreign materials.

4. The system as set forth in claim 1 in which said indicator rod is guided in a path substantially coaxial of said cap and nipple whereby said indicator rod is readable from all angles independently of the degree of tightening of said cap on said nipple.

5. The system as set forth in claim 4 in which a plug recessed into the distal end of said casing provides the guide aperture for said indicator rod, said rod being entirely recessed within said guide aperture when said pressure sensing piston moves to its retracted position whereby said indicator rod and said plug are protected against accident from vandalism.

6. The system as set forth in claim 5 in which said casing and said plug are made of non-stick plastic to maintain free the path of movement of said indicator rod and to ensure its readability.

* * * * *